(12) United States Patent
Kidouchim

(10) Patent No.: US 6,869,180 B1
(45) Date of Patent: Mar. 22, 2005

(54) UNIVERSAL EYEGLASS ATTACHMENT

(76) Inventor: Armand Kidouchim, 5953 El Escorpion Rd., Woodland Hills, CA (US) 91367

(*) Notice: Subject to any disclaimer, the term of this patent is extended or adjusted under 35 U.S.C. 154(b) by 0 days.

(21) Appl. No.: 10/659,227

(22) Filed: Sep. 9, 2003

(51) Int. Cl.⁷ ................................................. G02C 9/00
(52) U.S. Cl. .......................................... 351/47; 351/57
(58) Field of Search .............................. 351/47, 48, 57, 351/58, 44, 41

(56) References Cited

U.S. PATENT DOCUMENTS

| | | | |
|---|---|---|---|
| 4,247,178 A | * | 1/1981 | Cook ........................... 351/47 |
| 5,335,025 A | | 8/1994 | Wang |
| 6,089,708 A | | 7/2000 | Ku |
| 6,352,342 B1 | | 3/2002 | Huang |
| 6,354,703 B1 | | 3/2002 | Sadler |
| 6,533,411 B1 | | 3/2003 | Chen et al. |
| 2002/0140897 A1 | | 10/2002 | Huang |
| 2003/0112408 A1 | | 6/2003 | Zelman |

FOREIGN PATENT DOCUMENTS

WO     WO 90/09611     8/1990

* cited by examiner

*Primary Examiner*—Hung Xuan Dang
(74) *Attorney, Agent, or Firm*—Kelly Lowry & Kelley, LLP

(57) ABSTRACT

A universal eyeglass attachment includes a docking head which is removably attachable to a frame of primary eyeglasses. A clip or coupling is attached to auxiliary eyewear and configured for connection to the docking head so as to removably attach the auxiliary eyewear to the primary eyeglasses. The clip or coupling is preferably pivotally attached to the auxiliary eyewear to enable a user to selectively move the eyewear away from lenses of the primary eyeglasses. Swing-arm locks can be incorporated to strengthen the frictional engagement fit between the auxiliary eyeware and eyeglass frame.

12 Claims, 5 Drawing Sheets

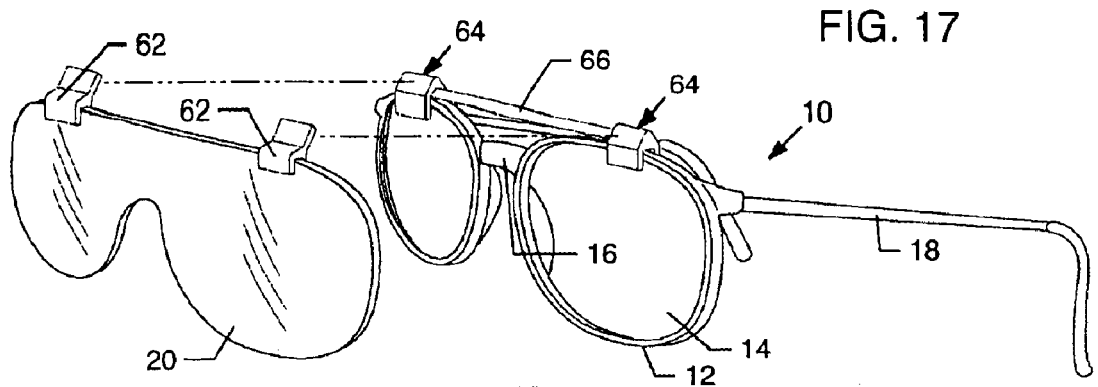
FIG. 17
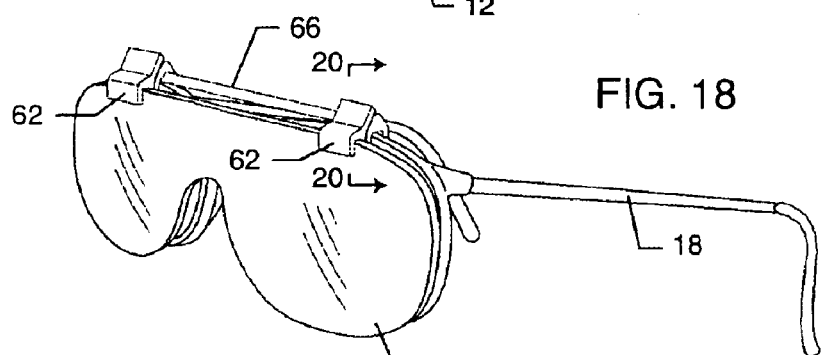
FIG. 18
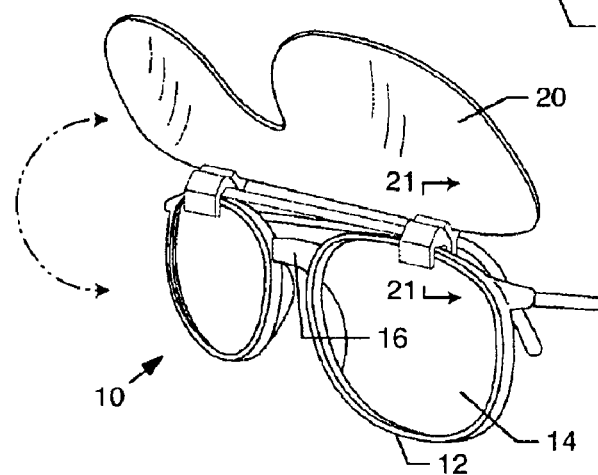
FIG. 19
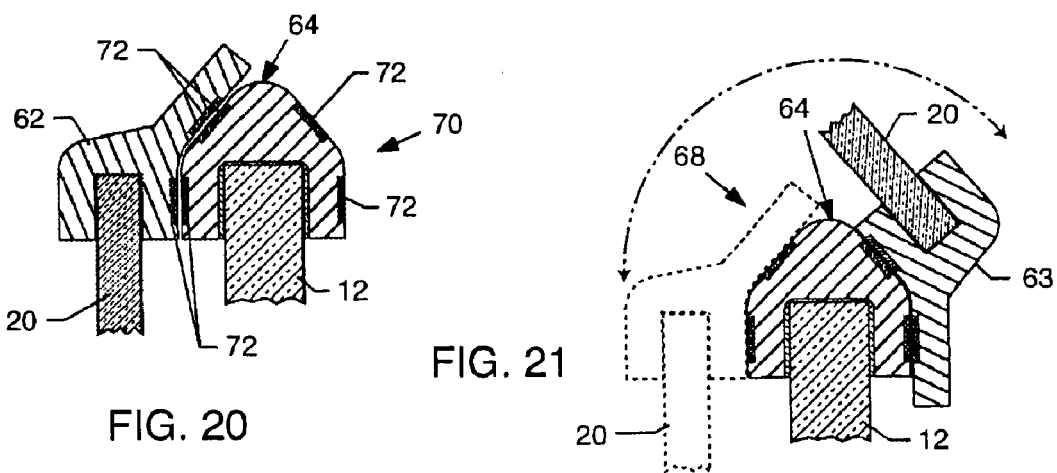
FIG. 20
FIG. 21

UNIVERSAL EYEGLASS ATTACHMENT

BACKGROUND OF THE INVENTION

The present invention generally relates to eyeglass devices. More particularly, the present invention relates to the mounting of auxiliary eyeglasses or other eyewear, such as sunglass lenses, on primary eyeglasses.

People often wear eyeglasses to correct their vision, be it near-sighted or far-sighted. The eyeglasses have a main frame with lenses fitted thereto. Protective-lens eyeglasses are also available of generally the same construction.

There are instances, such as when in the sun, when an auxiliary eyewear, such as sunglasses, is desirable. There exist clip-on sun shades which are clipped to the rim or frame of the primary eyeglasses. However, most such sun shades are typically not able to be pivoted upwardly and out of view, such as when entering a building or the like from outdoors. Instead, the sun shades must be completely removed and stored in a pocket or the like of the eyeglass wearer.

Advancements in the field have led to the use of magnetic members which are used to removably attach the sun shade or auxiliary lenses to the eyeglasses. However, the magnetic connections are typically not pivotally arranged so as to enable the user to "flip-up" the sun shades away from the eyeglass lenses.

Yet other prior art auxiliary eyewear require specially manufactured eyeglasses for a stable connection. Alternatively, the auxiliary eye shades must be semi-permanently attached to the eyeglasses, such as using screws or the like. Of course, this does not enable the eyeglass wearer to conveniently remove the sun shades or auxiliary lenses.

In addition to the shortcomings described above, prior art auxiliary eyeware in general has the shortcoming that they are not adapted to be connected to any piece of eyeware. That is, the prior art auxiliary eyeware does not have universal connection means. Instead, they rely upon clips or attachments to the eyeglass to the primary eyeglasses which are usually very specific in nature. If not completely specific, the auxiliary eyeware still suffers a drawback of connecting to the primary eyeware in such a manner so as to limit it to only several styles of eyeware. This is due to the differences between the "nose bridge" portion of the frames and the size of the frames of the primary eyeware which varies dramatically between different styles.

Accordingly, there is a continuing need for auxiliary lenses or eye shades which can be easily detached and connected to a pair of pre-existing eyeglasses. Such auxiliary eyeware should be capable of being detatchably connected to virtually any primary eyeware so as to be universal in nature. Preferably, such auxiliary lenses should be capable of being pivoted out of alignment with the lenses of the regular eyeglasses. The present invention fulfills these needs and provides other related advantages.

SUMMARY OF THE INVENTION

The present invention resides in a universal eyeglass attachment for removably attaching auxiliary eyeware to primary eyeglasses.

The universal eyeglass attachment of the present invention generally includes a docking head including saddles which are adapted to frictionally engage the primary eyeware frame. A clip associated with the auxiliary eyeware is configures to connect to the docking head so as to removably attach to the auxiliary eyeware to the primary eyeware. Preferably, the clip is pivotally attached to the auxiliary eyeware such the auxiliary eyeware can be moved between an in-use position wherein the auxiliary eyeware is aligned with the one or more lenses of the primary eyeware, and a non-use position wherein the auxiliary eyeware is pivoted upward and out of alignment with the auxiliary eyeware. The saddles may include swing-arms for selectively locking them to the primary eyeglass frame.

In one embodiment, the clip includes a tongue which frictionally engages the docking head. In such embodiment, the saddles are typically interconnected by a cross-bridge having means, such as a slot, for frictionally engaging the tongue of the clip.

In another embodiment, the clip frictionally engages protrusions of a cross-bridge interconnecting the saddles.

In yet another embodiment, the docking head is configured to be removably attached to the nose bridge portion of the primary eyeware frame. The docking head is expandable to substantially cover the nose bridge portion. Typically, the docking head comprises two slidably connected members which are biased in an expanded position. The clip includes an open-faced slot configured to frictionally receive at least a portion of the docking head therein, and thus removably attached the auxiliary eyeware to the primary eyeware. The clip may include a sling-arm for selectively locking the clip to the docking head. Preferably, the clip is pivotally attached to the auxiliary eyeware to allow the movement described above.

In yet another embodiment, the saddles which are attached to the primary eyeware frame have front and rear facets. Couplings are associated with the auxiliary eyeware and magnetically attachable to the saddles. Typically, magnets are embedded within the front and rear facts of the saddles as well as the coupling to provide the magnetic attachment. In a particularly preferred embodiment, the front facet of each saddle comprises two angularly offset front surfaces, and the rear facet comprises two angularly rear surfaces such that the auxiliary eyeware can be pivoted between the front facet so as to be over the at least one lense of the primary eyeware, and moved into contact with the rear facet which is out of alignment with the lens of the primary eyeware. The couplings include contact bases which are configured to mate the front and rear facets of the saddles to accomplish this.

Other features and advantages of the present invention will become apparent from the following more detailed description, taken in conjunction with the accompanying drawings, which illustrate, by way of example, the principles of the invention.

BRIEF DESCRIPTION OF THE DRAWINGS

The accompanying drawings illustrate the invention. In such drawings:

FIG. 17 is a partially exploded perspective view of yet another eyeglass attachment embodying the present invention;

FIG. 18 is a front perspective view similar to FIG. 17, with the auxiliary eyeware attached to the primary eyeware in an in-use position;

FIG. 19 is a front perspective view similar to FIG. 18, with the auxiliary eyeware pivoted away from the lenses of the primary eyeware;

FIG. 20 is a partially fragmented cross-sectional view taken generally along line 20—20 of FIG. 18, illustrating the magnetic attachment of the auxiliary eyeware and the primary eyeware in an in-use position; and FIG. 21 is a partially fragmented and cross-sectional view taken generally along line 21—21 of FIG. 19, illustrating the auxiliary eyeware being pivoted away from the lenses of the primary eyeware by virtue of different magnetic attachment points.

DETAILED DESCRIPTION OF THE PREFERRED EMBODIMENTS

As illustrated in the accompanying drawings for purposes of illustration, the present invention resides in a universal eyeglass attachment for attaching an auxiliary eyewear or lens to a frame of primary eyeglasses.

Figure 1:
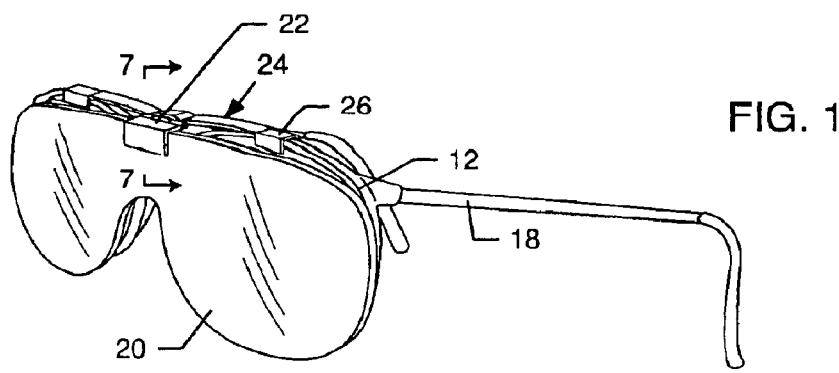
FIG. 1 is a front perspective view of an auxiliary lens disposed over lenses of regular eyeglasses, in accordance with the present invention.
Figure 2:
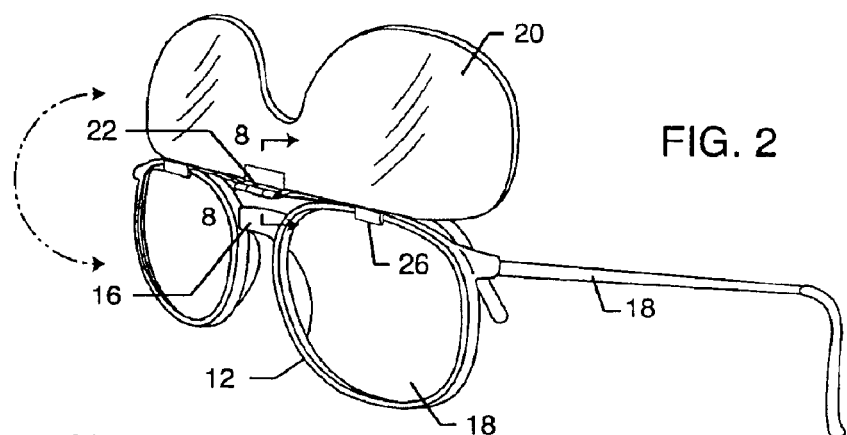
FIG. 2 is a front perspective view similar to FIG. 1, illustrating the auxiliary eyewear pivoted upwardly and away from the lenses of the regular eyeglasses.

With reference to FIGS. 1 and 2, a universal eyeglass attachment embodying the present invention is illustrated attached to a pair of primary eyewear 10, typically eyeglasses having a frame 12 which supports one or more lenses 14, and which includes a nose bridge portion 16, and elongated ear attachments 18. The universal eyeglass attachment includes an auxiliary lens 20, having a clip 22 which is removably mounted to a docking head 24 attached to the frame 12 of the eyeglasses 10. Although the auxiliary lense 20 is illustrated as a single lens, such as a sun shield, it should be understood that the auxiliary lense 20 can be of different configurations and uses. For example, the auxiliary lense 20 can comprise a protective shield or eyeware. The auxiliary lense 20 can also comprise one or more lenses within a frame, similar to the primary eyeware 10. The selection of the auxiliary lense 20 will depend upon the need of the user.

As illustrated in FIGS. 1 and 2, preferably the clip 22 is pivotally attached to the auxiliary eyeware 20 such that the eyeware or lense 20 can be moved between an in-use position wherein the lense 20 is generally aligned with the one or more lenses 14 of the primary eyeware 10, or pivoted upwardly so as to be out of alignment with the lenses 14 of the primary eyeware 10 and in a non-use position.

Figure 3:
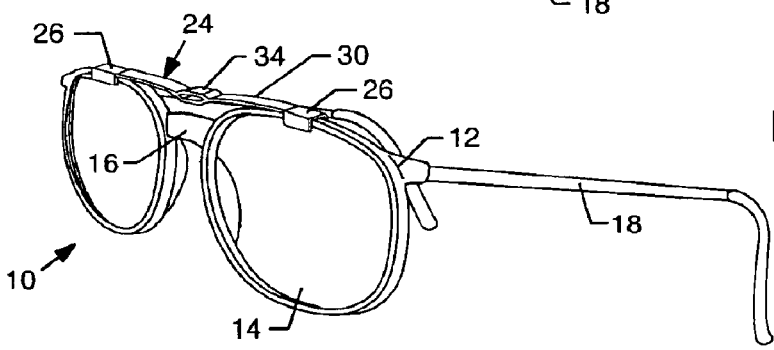
FIG. 3 is a front perspective view illustrating a docking head attached to the frame of the regular eyeglasses in accordance with the present invention.
Figure 4:
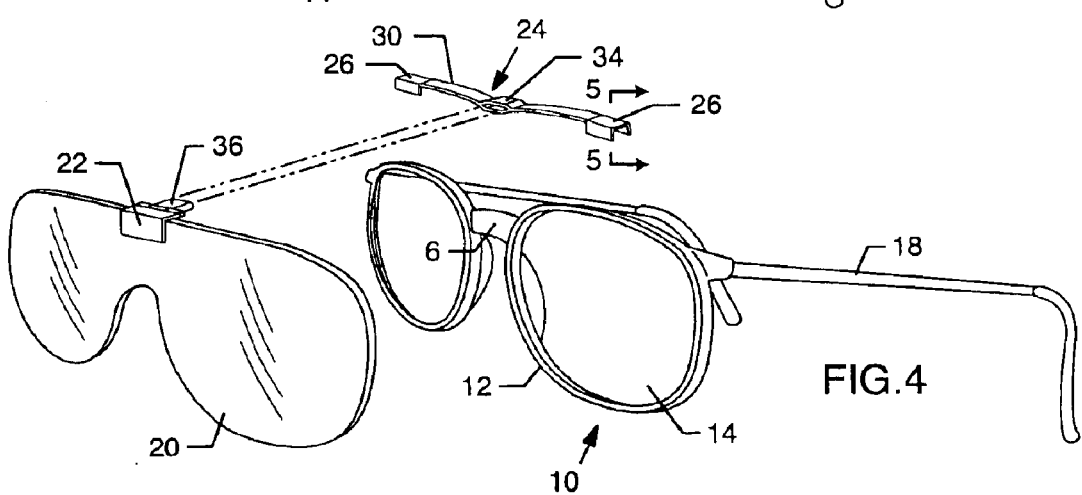
FIG. 4 is a partially exploded perspective view of the primary eyeglasses, docking head, and a clip pivotally attached to an auxiliary eyeware which is connectable to the docking head.
Figure 5:
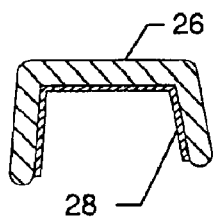
FIG. 5 is a cross-sectional view taken generally along line 5—5 of FIG. 4, illustrating a preferred configuration of a saddle of the docking head used to removably attach it to the primary eyeglass frame.
Figure 9:
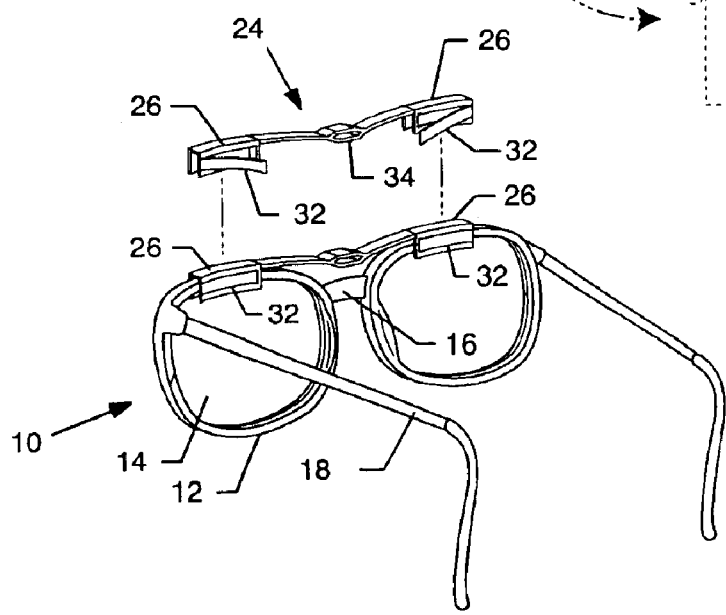
FIG. 9 is a partially exploded and rear perspective view of a primary eyeware having a docking head embodying the present invention with swing arms to lock the docking head thereon.

With reference now to FIGS. 3–5, the docking head 24 includes a pair of saddles 26 which are configured to be removably attached to the frame 12 of the primary eyeware, in particular, the saddles 26 are configured to be attached to an upper portion of the frame 12 which encircles the lenses 14. As shown in FIG. 5, preferably the saddles 26 are of a U-Shaped configuration having a cushion grip material 28 lining the inner-surface thereof to protect the frame 12 of the eyeware 10 from being damaged as well as providing a compressible material to accommodate frames 12 of different thicknesses. As shown in FIG. 9, the saddles 26 may include swing-arms 32 which can be used to accommodate frames 12 of different thicknesses and serve to tighten and lock the saddles 26 onto the eyeglass frame 12. The swing-arms 32 are unlatched when the saddles 26 are placed onto the primary eyeware 10 and then pivoted closed against the frame 12 to securely lock the docking head 24 in place. The reverse steps are taken to remove the docking head 24.

Typically, the saddles 26 are interconnected with a cross-beam 30. This cross-beam 30 includes means for removably attaching the clip 22. Such means in the embodiment illustrated in FIGS. 1–9 comprises a slot 34 formed in the cross-beam and which is configured to receive a tongue 36 extending from clip 32.

Figure 6:
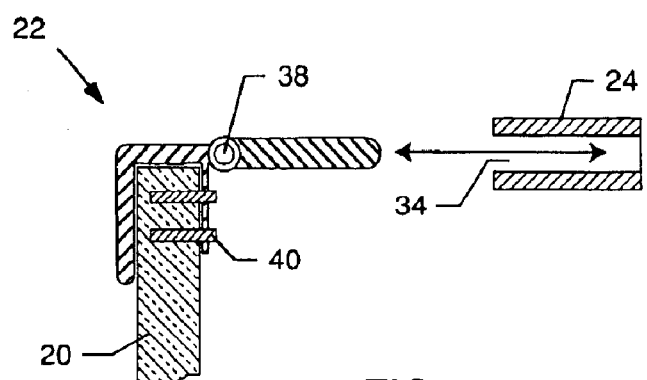
FIG. 6 is a cross-sectional view illustrating a tongue of the clip insertable into a slot of the docking head in accordance with the present invention.
Figure 7:
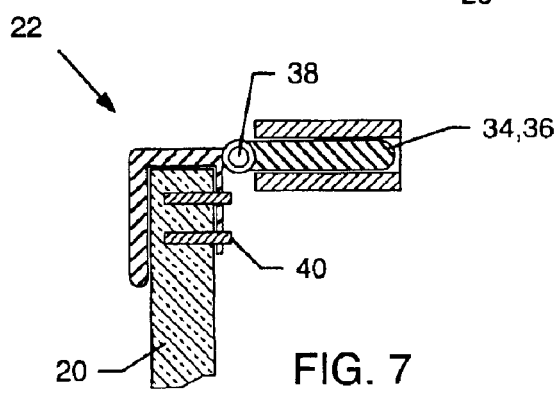
FIG. 7 is a cross-sectional view taken generally along line 7—7 of FIG. 1, illustrating the auxiliary eyeware attached to the docking head and in an in-use position.
Figure 8:
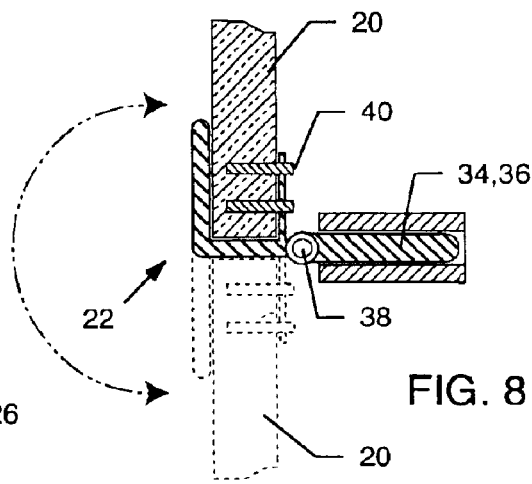
FIG. 8 is a cross-section view taken generally along line 8—8 of FIG. 2, illustrating the auxiliary eyeware being pivoted upwardly and away from the lenses of the primary eyeware.

With references now to FIGS. 6–8, cross-sectional views are shown illustrating the frictional engagement of the tongue 36 of clip 32 with the slot 34 of docking head 24. The docking head 24 may include catches, releasable catches or the like so as to lock the tongue 36 therein, although not illustrated. The important aspect is that the clip 22 can be removably attached to the docking head 24, thus removably attaching the auxiliary eyeware 20 to the primary eyeware 10. As illustrated, the clip 22 includes a hinged portion 38 to allow pivotal movement between the tongue 36 and the portion of the clip 22 attached to the auxiliary lense for eyeware 20. Clip 22 can be attached to auxiliary eyeware 20 by any known means, including the illustrated pins 40, or by adhesive, welding or otherwise. The incorporation of hinge 38 enables the auxiliary eyeware lense to be pivotally in front of the lenses 14 of the primary eyeware 10, and away from the lenses 14, as illustrated and described above.

Figure 10:
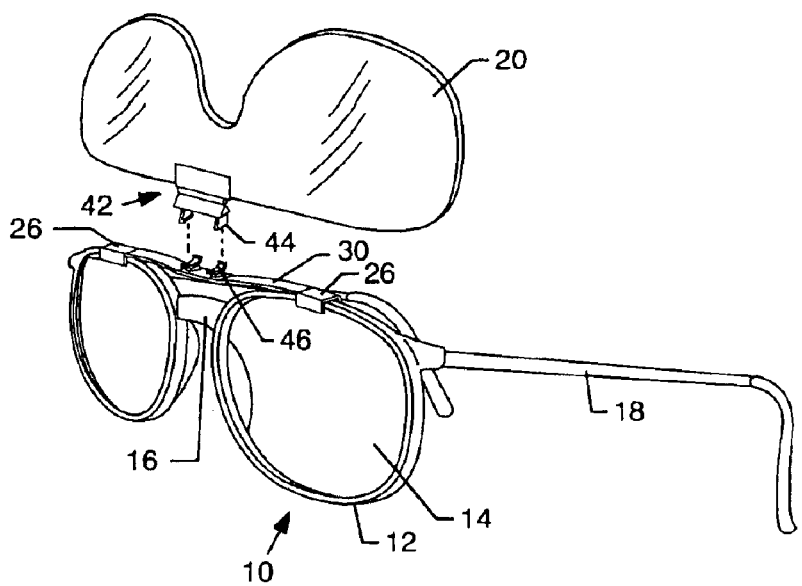
FIG. 10 is a partially exploded perspective view of yet another attachment mechanism used to removably connect auxiliary eyeware and primary eyeware in accordance with the present invention.
Figure 11:
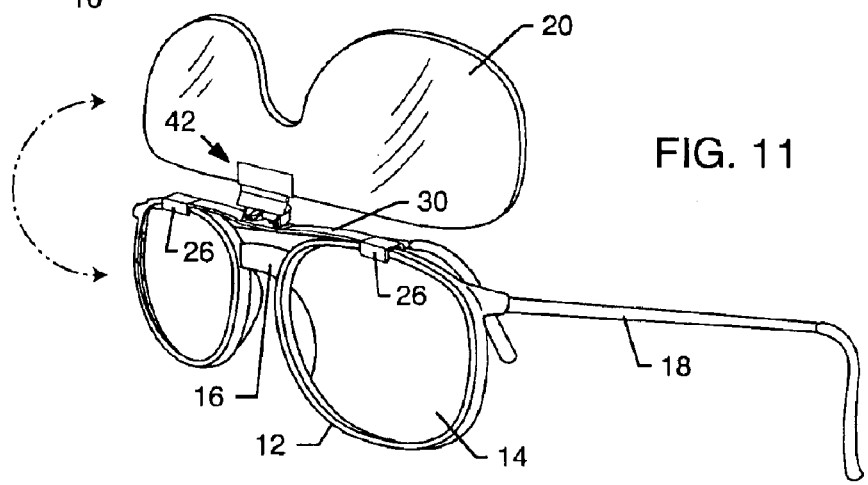
FIG. 11 is a front perspective view illustrating the auxiliary eyeware attached to the primary eyeware and moved into a non-use position.
Figure 12:
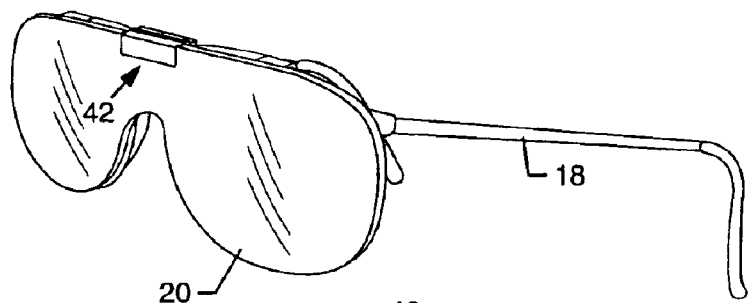
FIG. 12 is a front perspective view illustrating the auxiliary eyeware pivoted downwardly into an in-use position.
Figure 13:
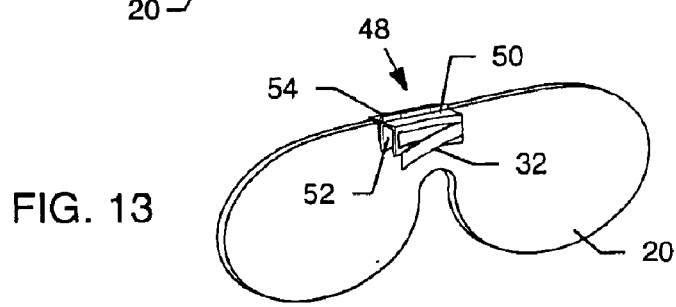
FIG. 13 is a rear perspective view of an auxiliary eyeware having a clip embodying the present invention with a swing-arm.

With reference now to FIGS. 10–12, another embodiment of the present invention is illustrated wherein clip 42, which is also pivotally attached to auxiliary eyeware 20 includes protrusion 44 which frictionally engage with protrusion 46 of the docking head 24. Such protrusion 44 or 46 may form a snap-fit connection or the like. Once engaged, the auxiliary lense can be pivotally moved as described above and illustrated in FIGS. 11 and 12. Thus, it would be appreciated by those skilled in the art that different mechanisms and design may be implemented for removably attaching the auxiliary eyeware and primary eyeware 10 using a clip and docking head in accordance with a broad concept illustrated and described above.

With reference now to FIGS. 13–16, yet another embodiment of the present invention is illustrated. The auxiliary lense or eyeware 20 has a clip 48 attached thereto which includes a portion fixed to the auxiliary eyeware 20 and a body 50 defining any open-ended elongated slot 52 which is pivotally attached to the clip 48 with hinge 54. As will be more fully described herein, the body 50 may include a swing-arm 32 for locking the body 50 to a docking head 56.

Figure 14:
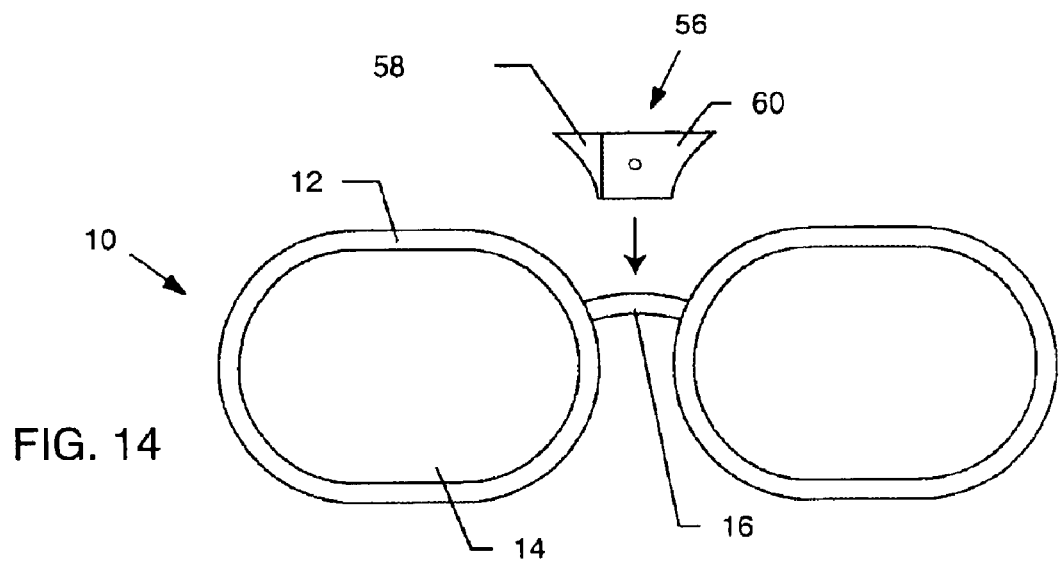
FIG. 14 is a front view of a primary eyeware with a docking head embodying the present invention being inserted thereon.
Figure 15:
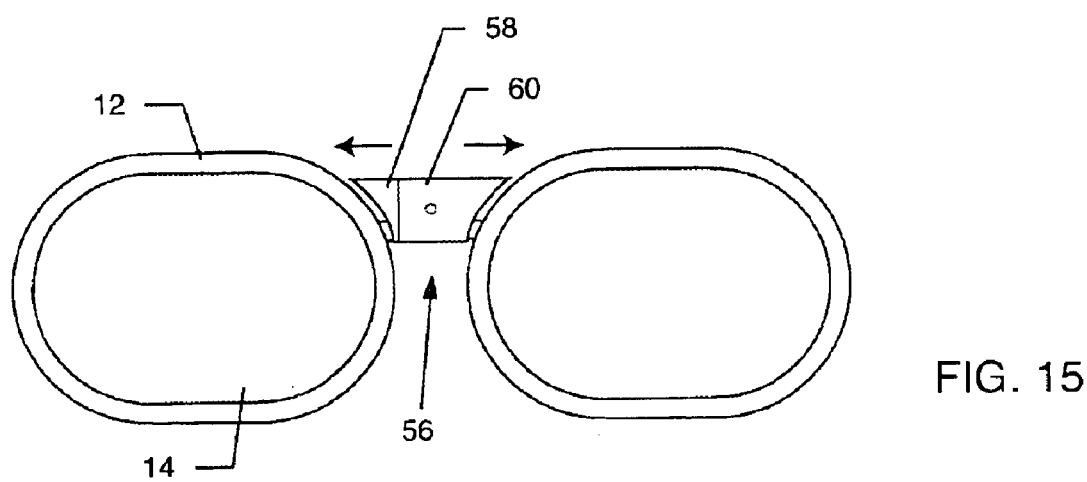
FIG. 15 is a front view similar to FIG. 14, illustrating the docking head expanding over a nose bridge portion of the frame of the primary eyeware.
Figure 16:
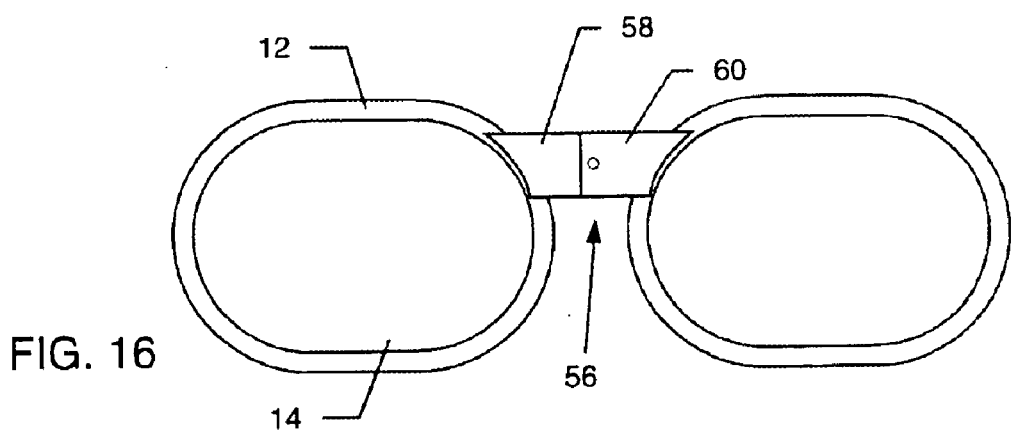
FIG. 16 is a front elevational view similar to FIG. 15, with the docking head completely expanded and ready for attachment to the clip of the auxiliary eyeware of FIG. 13.

With particular reference now to FIGS. 14–16, the docking head 56 is comprised of two members 58 and 60 which are slidably interconnected with one another. These slidable members 58 and 60 include an open-face recess or slot for receiving the nose bridge 16 portion of the primary eyeware frame 12. Members 58 and 60 are biased outwardly, or in an expanded position, such that when compressed and placed on the nose bridge portion 16, they naturally expand outward and towards the lense-supporting portion of frame 12. Such biasing means can comprise a compression spring associated with the slidable members 58 and 60. Once the docking head 56 is secured to the nose bridge portion 16, the body 50 is attached thereto by inserting slot 52 over the docking head 56. The swing-arm 32 may then be used to secure the clip 48, and auxiliary eyeware 20, to the docking head 56. The auxiliary eyeware 20 can then be pivoted upward and downward, as described above.

With reference now to FIGS. 17–21, yet another embodiment of the present invention is illustrated wherein couplings 62 attached to the auxiliary eyeware 20 are magnetically attached to the saddles 64. To ensure proper spacing, a cross-bar 66 typically interconnects the saddles 64. The saddles 64 include a front facet 68 and a rear facet 70. Each facet includes angularly offset faces having a magnet 72 imbedded therein or otherwise having magnetic properties. The coupling 62 is configured to essentially mate with the angled faces. Preferably, the coupling 62 also include a pair of magnets 72 which are magnetically attracted to the magnets 72 of the front and rear facets 68 and 70 of the saddles 64.

As shown in FIGS. 20 and 21, where the auxiliary eyeware 20 is desired to be in front of the lenses 14, the coupling 52 is magnetically attached to the front facet 68 of the saddles 64. The magnetic attraction between the coupling 62 and saddle 64 is such so as to hold the auxiliary eyeware 20 in place relative to the primary eyeware 10. The auxiliary eyeware or lense 20 can be moved out of alignment with the lenses 14 of the primary eyeware 10 by moving the coupling 62 from the front facet 68 to the rear facet 20, as illustrated in FIG. 21, such that the auxiliary eyeware lense 20 extends upwardly out of alignment with the lenses 14, yet not in contact with the forehead of the wearer of the eyeglasses 10. The angular offset of the faces of the front and rear facets 68 and 70 enable the auxiliary eyeware 20 to be positioned such. As the saddles 64 are removably attached to the frame 12 of the eyeglasses 10, they can be removed and inserted onto another pair of primary eyeware so that the auxiliary eyeware 20 can be attached to other eyeware as well.

Thus, those skilled in the art will appreciate the present invention provides a universal eyeglass attachment for a pre-existing pair of eyeglasses or other primary eyeware without having to alter the eyeglasses 10 in any manner. Additionally, the universal eyeglass attachment of the present invention enables auxiliary eyewear 20, such as sunshades, to be easily attached and removed from the primary eyeware 10. Moreover, due to the pivotal connection of the clip and auxiliary eyeware 20, the auxiliary eyeware 20 can be pivoted but of alignment with the lenses of the primary eye wearer so as not to be in the line of sight. Such movement allows not only sun shades to be moved in front of and away from eyeglasses to accommodate, for example, the entering into a dark room, but also other uses. For example, the auxiliary eyeware 20 may comprise a prescription pair of lenses, which in conjunction with the lenses 14 of the primary eyeware 10 serve as bifocals or the like. The auxiliary eyeware lense or lenses 20 can be magnifying lenses for use of surgeons, dentists, jewelers, etc. Thus, the universal eyeglass attachment of the present invention can be used in a variety of settings and for a variety of different uses.

Although several embodiments have been described in detail for purposes of illustration, various modifications may be made without departing from the scope and spirit of the invention. Accordingly, the invention is not to be limited, except as by the appended claims.

What is claimed is:

1. A universal eyeglass attachment for removably connecting auxiliary eyewear to primary eyewear having a frame supporting at least one lens, the attachment comprising:

a docking head including saddles adapted to frictionally engage with the primary eyewear frame; and a clip associated with the auxiliary eyewear and configured for connection to the docking head so as to removably attach the auxiliary eyewear to the primary eyewear.

2. The attachment of claim 1, wherein the clip includes a tongue which frictionally engages the docking head.

3. The attachment of claim 2, wherein the saddles are interconnected by a cross-bridge having means for frictionally engaging the tongue of the clip.

4. The attachment of claim 3, wherein the frictionally engaging means comprises a slot of the cross-bridge which frictionally engages the clip tongue.

5. The attachment of claim 1, wherein the clip frictionally engages protrusions of a cross-bridge interconnecting the saddles.

6. The attachment of claim 1, wherein the saddles each include a swing-arm for selectively locking the saddles to the primary eyeglasses frame.

7. The attachment of claim 1, wherein the clip is pivotally attached to the auxiliary eyewear.

8. A universal eyeglass attachment for removably connecting auxiliary eyewear to primary eyewear including a frame having a nose bridge extending between a pair of lenses, the attachment comprising:

a docking head configured to be removably attachable to the nose bridge portion of the primary eyewear frame, the docking head being expandable to substantially cover the nose bridge portion of the primary eyewear frame; and a clip attached to the auxiliary eyewear and configured for connection to the docking head so as to removably attach the auxiliary eyewear to the primary eyewear.

9. The attachment of claim 8, wherein the docking head comprises two slidably connected members.

10. The attachment of claim 9, wherein the slidably connected members are biased in an expanded position.

11. The attachment of claim 9, wherein the clip includes a swing-arm lock for selectively locking the clip to the docking head.

12. The attachment of claim 8, wherein the clip includes an open-faced slot configured to frictionally receive at least a portion of the docking head therein.

* * * * *